March 16, 1965  N. P. ROWELL ETAL  3,173,752
METHOD FOR IMPREGNATING REGENERATED CELLULOSE FILAMENT
TOWS AND MAKING STAPLE FIBERS THEREFROM
Filed Oct. 5, 1961
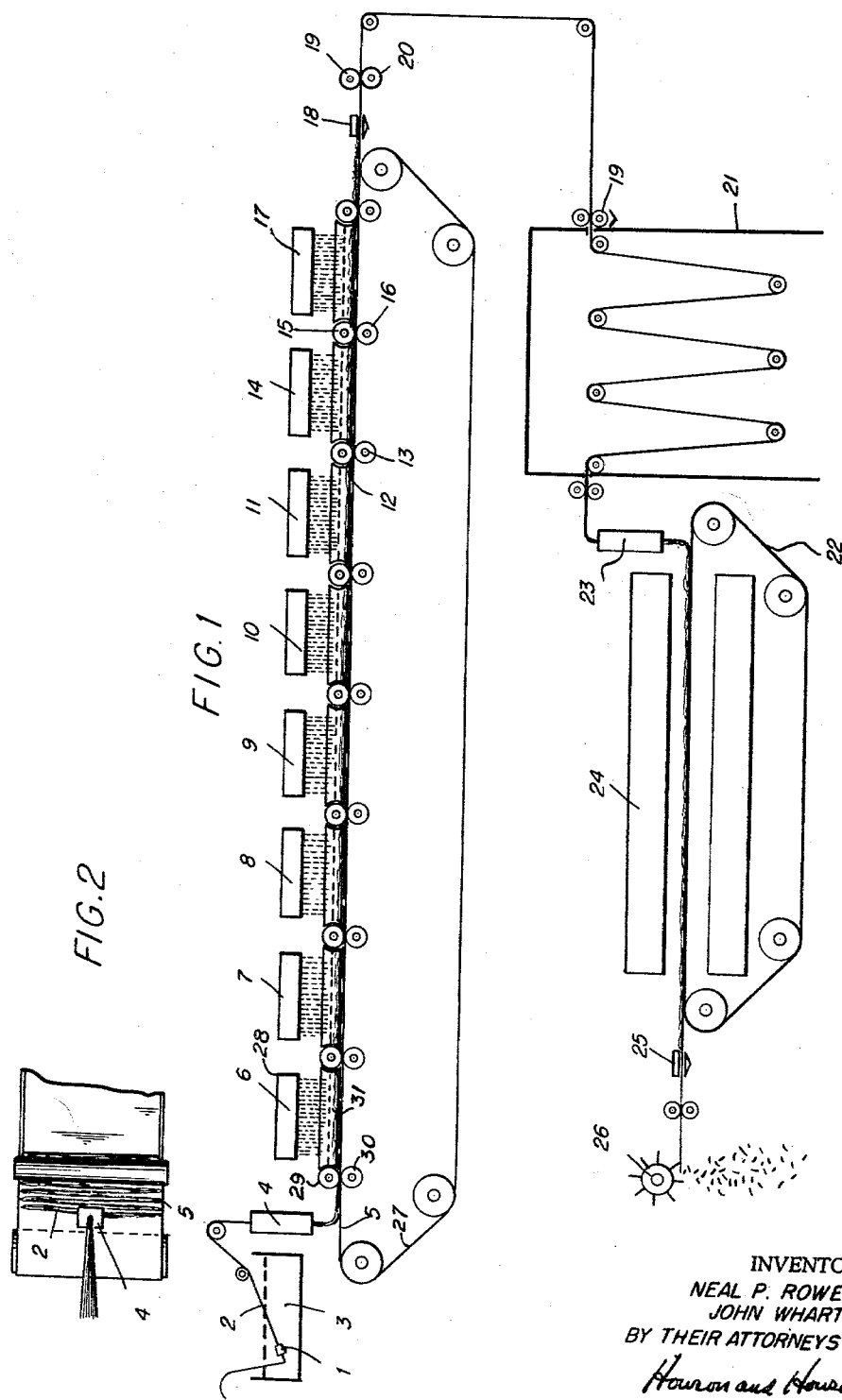
INVENTORS
NEAL P. ROWELL
JOHN WHARTON
BY THEIR ATTORNEYS

United States Patent Office 3,173,752
Patented Mar. 16, 1965

3,173,752
METHOD FOR IMPREGNATING REGENERATED CELLULOSE FILAMENT TOWS AND MAKING STAPLE FIBERS THEREFROM
Neal P. Rowell and John Wharton, both of Mobile, Ala., assignors, by mesne assignments, to Courtaulds, Limited, London, England, a British company
Filed Oct. 5, 1961, Ser. No. 143,093
9 Claims. (Cl. 8—116.4)

This application is a continuation-in-part of our copending application Ser. No. 639,420, filed February 11, 1957, and now forfeited.

This invention relates to a method for the making of regenerated cellulose staple fibers containing cross-linking agents particularly cross-linking agents such as formaldehyde and heat-hardenable resinous materials.

For some time, it has been considered desirable to treat regenerated cellulose fibers with cross-linking agents. By so doing a variety of effects can be obtained of which perhaps the most important is that the water imbibition of the fiber can be considerably decreased. Water imbibition is defined as the percent by weight of water retained in saturated material after centrifuging a 0.5 gram sample for 5 minutes at 1000 G. See Journal of the Society of Dyers and Colourists, October 1948, page 331, and Proceedings Journal of the Textile Institute 40, page P678 (1949). In general it is considered that these effects are caused by reactions of the agents with the cellulose to cross-link adjacent cellulose chains.

Previous techniques for the production of regenerated cellulose staple fiber containing cross-linking agents had involved cutting up a tow of the fiber to form a staple and then subjecting the staple in the form of a moving bed to a coarse spray of the cross-linking agent solution or dispersion. After spraying, the fiber would be dried and then heated to cure it. In such processes difficulty is often experienced in treating all the fibers evenly. Too much cross-linking agent may be found in one part of a fiber and too little in another. Different fibers in the same batch may contain different quantities of agent.

In accordance with the present invention these difficulties are overcome by treating the fiber while it is in the form of a continuous tow with an aqueous liquid containing a cross-linking agent. After treatment with the solution the tow may be dried, heated to cure the agent and then cut up into staple.

The term "tow" as used in this application means a mass of parallel filaments having a total denier between about 3000 and about 1,500,000. The denier of the individual filaments in the tow may vary between say 1 and 15.

The process may be employed with various types of regenerated cellulose, such for example as regenerated cellulose fibers made by the cuprammonium process, by the nitrate process, or by the viscose process. Preferably tow made by the viscose process is used. Tow impregnated according to the present process has its largest application in the production of staple fiber. However, it can be used as such; for example, it can be braided to obtain a rope, for use as valve packing.

The cross-linking agents which may be applied by means of the present invention comprise heat hardenable resinous materials, including the so-called reactant type resinous materials, as well as non-resinous materials such as formaldehyde, various polyaldehydes and hydroxyaldehydes.

Suitable heat hardenable resinous materials include the aminoplasts, which may be defined as heat hardenable resinous compositions which are the condensation products of compounds having at least two amino hydrogens, with methylol forming compounds. Typical aminoplasts are urea-formaldehyde, melamine-formaldehyde, dicyandiamide-formaldehyde, guanidine-formaldehyde and combinations of these. The term is also used to include the methylol amino-epihalohydrin compounds described in United States Patent No. 2,960,464 to George C. Daul.

The term is also used to include modified urea resins, i.e. methylol compounds such as methylated methylol urea, partially polymerized methylated methylol urea, methylated and unmethylated methylol ethylene ureas such as dimethylol ethylene urea, and methylated and unmethylated methylol 1,2-propylene ureas as will as dimethylol triazines, triazones and the like. These are the so-called reactant type resins, which are heat hardenable, but which for the most part remain water soluble under the conditions required for cross-linking.

Other resins which are suitable for use in the present invention are those formed by the reaction of formaldehyde and acrolein as described in United States Patent No. 2,696,477; resins formed by the reaction of acetone and formaldehyde as described in United States Patents Nos. 2,504,835 and 2,711,971; and polyepoxy resins, e.g. polyfunctional compounds having at least two epoxy groups linked through a hydrocarbon, polyhydric phenol or polyhydric alcohol group, such as the resins formed from saturated polyglycidyl ethers of polyhydric alcohols as described in United States Patent No. 2,752,269. Particularly useful compounds of the last named class are the condensation products of epichlorohydrin with ethylene glycols.

Cross-linking agents commonly used in the industry also include formaldehyde, dialdehydes such as glutaraldehyde and adipaldehyde; mixed aldehydes such as acrolein; glycidyl aldehydes; polyacetals (including diacetals of polyhydroxy compounds as described for example in United States Patent 2,786,081); divinyl sulfone; dihalohydrins, for example, dichlorohydrin; and di- and tri-azirdinyl phosphine oxides and sulfides such as are described in United States Patent 2,859,134.

It will be understood that the exact composition of the cross-linking material used is not a part of the present invention, and other cross-linking agents used in the textile industry may be employed as desired.

The conditions under which the cross-linking agents are applied will vary with the type of agent. Resinous materials are preferably applied while they are in a state such that they will form aqueous solutions or stable dispersions containing at least 5% by weight resinous material and such that the molecular size of the material is sufficiently small to enable the resin molecules to penetrate into the interior of the fiber. In general it is preferred to apply the resinous material while it is in a substantially precondensed, monomeric or low polymer state, with a molecular weight on the order of 100–1000, preferably less than about 600. The extent of polymerization which is permissible will depend on the type of resin being employed and as will be brought out more fully below, on the condition of the fiber at the time it is treated.

In carrying out the present process it is preferred that the fiber be treated in the never-dried state, i.e. while still in the gel state after spinning. In this condition, the tow absorbs the cross-linking agent far more readily, permitting a more thorough penetration of the material into the fiber. In particular the technique described by G. C. Daul, H. F. Wise and J. Wharton in their application Serial No. 635,695, filed January 23, 1957, now Patent No. 2,902,391, and its continuation-in-part Serial No. 819,465, filed June 10, 1959, now U.S. Patent 3,038,777, may advantageously be used in carrying out the invention. In employing this technique, the tow, while still in the gel state after spinning and before it has ever been dried sufficiently to convert it from the gel state, is treated with liquid containing the cross-linking agent and squeezed or otherwise processed until its liquid content (based on the weight of oven-dried impregnated fiber) is less than the water imbibition of the fiber in the gel state. The technique described is especially valuable in insuring that all the agent will be carried into the interior of the fibers.

The temperature of the liquid containing the cross-linking agent used to treat the fiber is not a critical factor and will vary with the particular resin being applied. Normally it will be between about 15° C. and about 50° C., preferably between about 20° C. and about 40° C.

The concentration of cross-linking agent in the aqueous impregnating liquid will again vary with the particular agent and with the type of fiber treated. Usually it will be between about 0.5 and about 15% by weight of the liquid.

The bath may contain various ingredients other than the cross-linking agent or its components. For example, it may contain a catalyst to aid in curing the cross-linking agent. Obviously the type of catalyst will depend on the particular agent being used.

When the cross-linking agent is formaldehyde a metallic salt which is a Lewis acid in the solid state is preferably used as the catalyst in accordance with the teaching of copending application Serial No. 81,956 of G. C. Daul et al., filed January 11, 1961, now U.S. Patent 3,113,826. In accordance with the teachings of that application, the amount of catalyst or curing agent used is between about 0.003 and about 0.09 mol per 100 g. of cellulose, normally equivalent to concentrations of from about 0.03 to about 0.9 mol/liter. The formaldehyde concentration is such as to furnish from 0.1 to 3% formaldehyde bound to the cellulose which may be economically furnished by concentrations of 0.5 to 6%, though higher concentrations may be used.

When a resinous cross-linking agent is used the solution may contain from say 5 to 15% of the resinous material, together with say 2 to 20% on the weight of the resin of a catalyst.

The liquid may also contain wetting agents to aid in penetration of the fiber by the cross-linking agent, as well as from 0.2 to 4% on the weight of the liquid, of a finishing agent to add lubricity, cohesion, water repellancy, scroop or other desired properties to the fiber. Materials well known to the art such as polyglycol stearate, lauryl ketene dimer, silicone emulsions, stearamido methyl pyridinium chloride, octadecyl pyridinium sulfate and others may be used alone or in combination for this purpose.

The time of contact between the reactant bath and the tow depends on the amount of cross-linking agent it is desired to have the tow take up. The time will therefore vary considerably, but will usually be between about 2 and about 20 minutes.

In certain instances, it is desirable to use a series of treatments with cross-linking solution in place of a single stage impregnation. In such multiple treatments, the tow removed from the initial bath would be squeezed to remove excess liquid, again immersed in a second solution, removed and squeezed and so on. Multiple treatments of this nature tend to give a more even treatment of the tow and are particularly valuable in impregnating high tenacity fibers. Such fibers are normally produced using spinning baths having high zinc sulfate contents (e.g. 2 to 10% $ZnSO_4$), followed by a fixation stretch in hot dilute acid, and have a much lower water imbibition than low tenacity fibers (65–80% compared to 100–130% for low tenacity fibers). In working with high tenacity fibers, it has also been found desirable to use cross-linking solutions having higher concentrations of agent, i.e. around 15%.

There is no theoretical limit to the number of such stages which may be used; however, as a practical matter, adequate results are usually obtained with at most four baths.

In passing through the liquid containing the cross-linking agent, the tow is normally plaited or looped on an endless belt type conveyor. Upon emerging from the final cross-linking treatment it is preferably taken off the belt as a straight strand and passed through squeeze rolls to remove excess liquid. As pointed out above, the squeezing will preferably be such that the liquid content of the squeezed tow (based on the oven dry weight of impregnated tow) is less than the gel water imbibition of the fiber. The liquid pick up after squeezing will normally be between about 70 and about 120%.

Drying is preferably carried out at a temperature of say 80 to 120° C. Drying time is whatever is required to bring the moisture content of the tow into equilibrium with the environment. Normally this is on the order of 10 to 45 minutes. The drying is preferably carried out while the tow is under a tension of say between about 0.1 and about 0.3 gram/denier to prevent kink formation and setting. If desired, the tow may be allowed to contract to say 4 to 7% of its length during drying.

While it is preferred to dry the tow under slight tension, in some circumstances this may not be necessary and it is within the scope of the invention to dry the tow while it is laid down on a belt in zigzag or plaited form, as described above in connection with the resin treating steps.

After drying the tow may be further heated to cure the cross-linking agent. The temperature necessary for curing depends on the particular agent being used. It is usually between about 110° and about 180° C. Curing time again varies with the cross-linking agent and also with the temperature used. It may vary from about 5 seconds to about 40 minutes and will normally be between about 2 and about 30 minutes.

It is not necessary to maintain the tow under tension during curing and hence where the tow was dried in a straight strand, it may again be laid down in a plaited or looped arrangement and cured in that form. Curing may be accomplished by circulating hot air over, around and through the tow, by using dielectric heaters capable of providing through radiation temperature of the degree required, or by other convenient means. When dielectric heating is used the time for curing given above may be substantially reduced.

The invention will be further described with reference to the accompanying drawing which is furnished to illustrate the invention. In the drawing:

FIG. 1 is a schematic flow diagram showing a preferred process according to the invention in which viscose tow is impregnated with a cross-linking agent.

FIG. 2 is a plan view of the system of FIG. 1 showing the way the tow is arranged during treatment.

Referring to the figures, viscose of any conventional composition is extruded through a multihole spinnerette 1 into a spinning bath 3 to form a tow 2 having a total denier of between about 3000 and about 1,500,000. The bath 3 may be of any conventional composition. Normally it will contain between about 7 and about 12% $H_2SO_4$, from about 14 to about 25% $Na_2SO_4$, from 0 to about 8% $ZnSo_4$, and from 0 to about 10% $MgSO_4$. Other ingredients well known to the art, such as surface active agents to prevent spinnerette incrustation, may also be present. The temperature of bath 3 is usually from say 40° C. to 60° C.

The tow is then run through a distributing device 4 of conventional design which lays it down in a zigzag or plaited pattern on an endless belt conveyor 5. The pattern of the tow as laid down is seen more clearly in FIG. 2, it being understood that in practice the successive courses of the two would be practically contiguous.

Having emerged from the spinning bath the tow is ready for further processing to complete its regeneration and to remove salts and other impurities. The steps required are well known to the art, are not a part of the present invention and will be described only briefly.

The device illustrated schematically in the drawings is similar to conventional wash machines familiar to the art. The conveyor 5 comprises a porous belt 27 driven by any convenient source of power past a number of treating stations 6 to 14 and 17. Each treating station comprises spray means such as that shown as 28 at station 6 for subjecting the tow disposed below it on the belt 27 to a treating liquid. Rollers such as 29 and 30 are arranged between the stations, and side plates such as 31 usually of glass or other corrosion resistant material are positioned to dam the flow of treating liquid off the side of the belt 27 so that normally a pool or puddle of the liquid builds up above the tow.

Referring to FIG. 1 the tow is subjected first to a regenerating treatment at station 6. The aqueous treating liquor contains from 1.0 to 2.0% $H_2SO_4$ and normally has a temperature of 60–92° C. and the tow is treated for say 3–15 minutes.

Following the regenerating treatment, the tow is subjected at station 7 to a neutral or slightly alkaline (pH 7.5–9.5) wash at a temperature of 75–90° C. for 3–15 minutes. This is followed by a desulfurization treatment at station 8. The treating liquor at 8 contains normally from 0.1 to 0.4% $Na_2S$ with from 0 to 0.4% $Na_2CO_3$ or NaOH. It is normally at say 55° to 70° C. and the treating time is on the order of 3–15 minutes.

Following the desulfurization treatment the tow is given a sulfide wash at station 9, comprising neutral water at 70–90° C. Again treating time is from 3 to 15 minutes.

The sulfide wash is followed in turn by a sour or acid wash at station 10 containing 0.2 to 0.5% $H_2SO_4$ or HCl. This treatment is at 20–25° C. for 3–15 minutes.

Finally the tow is washed at station 11 with neutral water at 60–85° C. to remove acid. The treatment time is again 3–15 minutes.

At this point the tow is in the never dried or gel state. It is then passed between rollers 12 and 13 where it is squeezed and is then treated at station 14 with an aqueous liquor containing from say 0.5 to 15% by weight of a cross-linking agent. The temperature of the bath is, as pointed out, from about 15 to about 50° C., preferably from about 20 to about 40° C.

If desired, the tow may be taken directly from the treatment at 14, squeezed and dried. Normally, however, it is brought into contact with at least one additional bath containing the cross-linking agent. This is shown in the drawing, where the tow from station 14 is squeezed between rollers 15 and 16 and then passed through a second cross-linking treatment at station 17. The concentration and temperature of the treating liquor at station 17 are preferably the same as stated above for station 14.

The tow is removed from station 17 and passed through a guide 18 which rearranges it from the plaited form in which it was carried on belt 5 into a straight strand. In this form it is passed through rollers 19 and 20 where it is squeezed, preferably to a water content less than the gel water imbibition value.

The time of contact of the tow with the liquid containing the cross-linking agent, for example, at stations 14 and 17 is such that upon emergence from squeeze rolls 19 and 20 the tow contains from say 0.35 to 20% of the cross-linking agent on the weight of the oven dried fiber. As pointed out, this total time will normally be from about 1 to about 20 minutes.

The tow still in single strand is now sent through a drier 21 of any conventional construction where it is dried at a temperature of say 90 to 110° C. During this time a tension of say 0.1 to 0.3 gram/denier is preferably maintained on the tow to prevent kink formation.

Upon removal from the drier, the tow is again laid down in a plaited pattern on a belt conveyor 22 by means of a distributing device 23. Conveyor 22 carries the tow through a curing oven 24 where it is cured at a temperature of say 110 to 180° C. It is then passed through another guide 25 where it is rearranged in a single strand for cutting up into staple by a cutter 26.

If desired, the cutter 26 may be eliminated and the tow may be collected and packaged as such.

The invention will be further described by means of the following specific examples, it being understood these are given only for illustration and in no way limit the invention beyond the scope of the claims.

*Example I*

A 30,000 denier tow containing filaments having a denier of 1.5 was obtained by spinning normal viscose with a cellulose content of 8.5% into a bath containing 10.5% acid, 1.0% zinc sulfate, and 22% sodium sulfate. The tow was stretched 50% between rollers before collection on a wash machine where while looped or plaited it was acid washed, desulfurized and washed. In a relatively neutral state, the tow was then taken into a bath containing 10% of a urea-melamine-epichlorohydrin-formaldehyde resin precondensate in which the ratio of the components was 2:1:1:6, at a temperature of 25° C. Preparation of this precondensate is described in Patent No. 2,960,464, referred to above. The tow was squeezed free of entrained liquor and was again treated with the resin precondensate solution. After this second immersion and impregnation of the tow, the tow was squeezed out under sufficient pressure so that the liquid content was reduced to 120% based on the weight of the oven dried impregnated fiber. The water imbibition of the fiber in the gel state was 130%. The tow was then taken to a conventional drying machine under tension of 0.2 gram/denier where it was dried at 99° C. and then into a curing zone in a relaxed state. The temperature of the curing zone was 157° C. and the time of curing 12 minutes.

Without resin precondensate treatment, the fibers in the tow after drying had a water imbibition of 120%, a dry tenacity of 2.4 grams per denier, a wet tenacity of 1.3 grams per denier, a dry extensibility of 22% and a wet extensibility of 25%. Following the full treatment in tow form, as described, the product had a water imbibition of less than 45% which rose to about 50% on scouring. The dry tenacity was (on the final denier) 2.9 grams per denier, the wet tenacity 2.0 grams per denier, the dry extensibility 14% and the wet extensibility 18%. The uniformity of the treated material was excellent.

*Example II*

A tow, as produced in Example I, followed by the same washing treatments, was treated prior to drying with a combination resin precondensate mixture containing 4% by weight of acrolein-formaldehyde reactant, 3% of a modified urea-formaldehyde resin precondensate and 0.6% $MgCl_2$ catalyst. The tow was passed through a first bath of this resin solution which consisted of the overflow drainage liquors from the next step. The tow was then squeezed thoroughly between nip rollers and was again impregnated fully with the resin mixture given above. Following a final thorough squeezing the tow was dried and cured in a relaxed condition, the curing temperature being 157° C. for 15 minutes. The fiber produced had a water imbibition of 42% which on scouring rose to 45%.

*Example III*

Viscose cellulose tow after the normal wash machine treatments was treated in a never-dried condition with a resin precondensate containing 6% gamma keto butanol, 3.1% formaldehyde and 0.6% sodium carbonate as a catalyst. After thorough squeezing to remove all superfluous solution, the tow was dried at 82° C., followed by curing at 143° C. for 25 minutes. The ratio of wet to dry strengths was raised from 0.50 to 0.60 by this treatment.

*Example IV*

A viscose tow having a denier of about 200,000 was made by extruding viscose containing 8.5% cellulose, and 5.5% NaOH at a gamma value of 40 into a spinning bath containing 10.0% $H_2SO_4$, 2.0% $ZnSO_4$ and 20%

$Na_2SO_4$, and having a temperature of 55° C. The tow was stretched 70% in a bath containing 2% $H_2SO_4$ at 85° C., washed in the conventional manner and then immersed while still in the gel state in a bath containing 1% HCHO and 3.4% $MgCl_2.6H_2O$ at 36° C. for one minute. The tow was then centrifuged for 1 minute to give a 95° wet pickup. A first length of the tow was dried under 160 pounds tension at 105° C. for one hour. A second length was dried at the same temperature and for the same time in a relaxed state. Both were then cured, relaxed, at 160° for 15 minutes and cut up into 1½" staple.

The tow which had been dried under tension showed a wet tenacity of 1.84 g./denier and a dry tenacity of 2.76 g./denier. That which had been dried relaxed showed a wet tenacity of 1.91 g./denier and a dry tenacity of 2.43 g./denier.

Staple fiber made in the same way as has just been described above, but treated with the formaldehyde solution after having been cut up into staple showed a wet tenacity of 1.72 g./denier and a dry tenacity of 2.06 g./denier.

The present process provides a convenient way for obtaining even distribution of cross-linking agent in cellulose fiber. Kinking and undesirable local concentrations of agent are avoided. In general fiber produced according to the present process will have higher tenacity than fiber subjected to cross-linking treatment after being cut into staple.

What is claimed is:

1. In a method for making cross-linked regenerated cellulose staple fiber the improvement which comprises impregnating said fiber while in the form of a tow comprising a plurality of substantially parallel filaments having a total denier of between about 3,000 and about 1,500,000 and while still in the aqueous gel state after spinning, with an aqueous liquid containing an agent capable of chemically cross-linking cellulose upon drying and curing, squeezing the tow to reduce its liquid content to below the water imbibition of the gel filaments, drying the tow, curing the tow in the substantial absence of tension, and then cutting up the tow to form staple.

2. In a method for making cross-linked regenerated cellulose staple fiber the improvement which comprises impregnating said fiber while in the form of tow comprising a plurality of substantially parallel filaments having a total denier between about 3,000 and about 1,500,000 and while still in the aqueous gel state after spinning, with an aqueous liquid containing formaldehyde and a curing agent for the formaldehyde-cellulose cross-linking reaction, squeezing the tow to reduce its liquid content to below the water imbibition of the gel filaments, drying the impregnated tow, curing the impregnated tow in the substantial absence of tension and then cutting up the cured tow to form staple.

3. The method claimed in claim 2 wherein the tow is dried under tension and cured in a relaxed condition.

4. The method claimed in claim 2 wherein the tow is dried at between about 80° C. and about 110° C. and under a tension of between about 0.1 and about 0.3 g./denier and cured at between about 125° C. and about 180° C. in a relaxed condition.

5. The method claimed in claim 2 wherein the tow is subjected to a plurality of formaldehyde treatments.

6. In a method for making cross-linked regenerated cellulose staple fiber the improvement which comprises impregnating said fiber while in the form of a tow comprising a plurality of substantially parallel filaments having a total denier of between about 3,000 and about 1,500,000 and while still in the aqueous gel state after spinning, with an aqueous liquid containing an agent capable of chemically cross-linking cellulose upon drying and curing, said agent comprising a heat hardenable resinous material, squeezing the impregnated tow to a liquid content less than the water imbibition of said gel filaments, drying the impregnated tow, curing the dried tow in the substantial absence of tension and then cutting up the cured tow to form staple.

7. The method claimed in claim 6 wherein the tow is dried under tension and cured in a relaxed condition.

8. The method claimed in claim 6 wherein the tow is dried at between about 80° C. and about 110° C. and under a tension of between about 0.1 and about 0.3 gram/denier and cured at between about 110° C. and about 180° C. in a relaxed condition.

9. The method claimed in claim 6 wherein the tow is subjected to a plurality of resin impregnating treatments.

References Cited by the Examiner

UNITED STATES PATENTS

| | | | |
|---|---|---|---|
| 2,315,265 | 3/43 | Lovett | 8—151.2 X |
| 2,363,019 | 11/44 | Schurmann et al. | 28—75 X |
| 2,623,807 | 12/52 | Schappel | 8—116.2 |
| 2,902,391 | 9/59 | Daul et al. | |
| 3,038,777 | 6/62 | Daul et al. | 8—116.3 X |

NORMAN G. TORCHIN, *Primary Examiner.*

MORRIS O. WOLK, *Examiner.*